R. G. MELCHIOR.
JAR FILLING FUNNEL.
APPLICATION FILED JULY 31, 1918.

1,368,640.

Patented Feb. 15, 1921.

Witnesses

Inventor
Ruby G. Melchior

By D. Swift & Co.
per Attorneys

UNITED STATES PATENT OFFICE.

RUBY G. MELCHIOR, OF PLACERVILLE, CALIFORNIA.

JAR-FILLING FUNNEL.

1,368,640.

Specification of Letters Patent. Patented Feb. 15, 1921.

Application filed July 31, 1918. Serial No. 247,552.

*To all whom it may concern:*

Be it known that I, RUBY G. MELCHIOR, a citizen of the United States, residing at Placerville, in the county of Eldorado, State of California, have invented a new and useful Jar-Filling Funnel; and I do hereby declare the following to be a full, clear, and exact description of the invention, such as will enable others skilled in the art to which it appertains to make and use the same.

This invention relates to an improved funnel for filling fruit jars and the like.

The invention aims to provide means carried by the funnel for supporting the funnel on the mouth end of the jar, thereby allowing the escape of steam exteriorly of the funnel, in fact between the funnel and the wall of the jar, as the hot fruit is passing through the funnel.

The invention further aims to provide a circular band spaced concentrically with relation to the exterior of the funnel by means of radial arms, which rest on the upper edge of the mouth end of the jar, to prevent the funnel from slipping into the mouth end, so as to permit the steam to pass out through the jar exteriorly of the funnel, as the hot fruit passes through the funnel.

Also by the provision of the band fitting down exteriorly of the mouth end of the jar, the funnel is prevented from lateral movement.

In practical fields the details of construction may necessitate alterations falling within the scope of what is claimed.

The invention comprises further features and combination of parts as hereinafter shown in the drawings and claimed.

In the drawings:—

Figure 1:
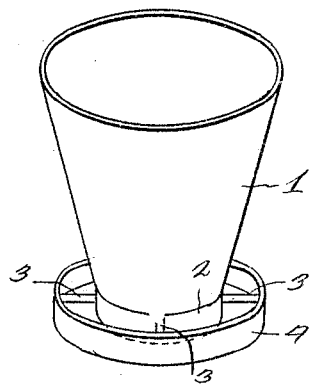
Figure 1 is a view in perspective of the improved filling funnel constructed in accordance with the invention.
Figure 2:
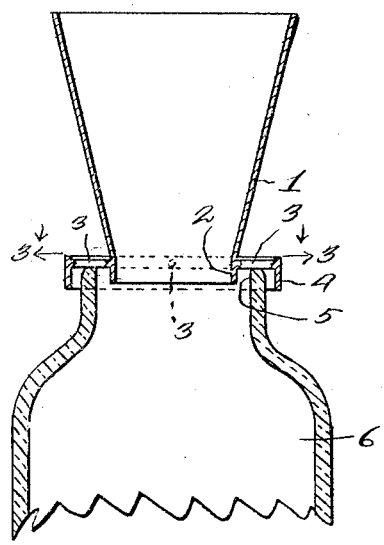
Fig. 2 is a sectional view vertically through the upper part of a fruit jar, showing the funnel and its supporting means in section as applied thereto.
Figure 3:
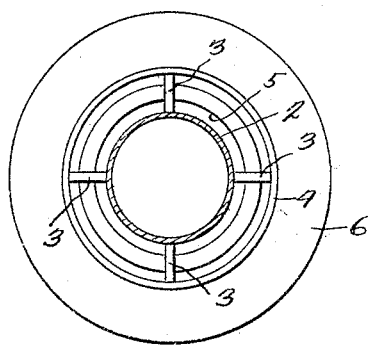
Fig. 3 is a sectional view on line 3—3 of Fig. 2.

Referring more especially to the drawings, 1 designates a funnel which may be of any conventional shape or configuration preferably of the taper shown, and the lower cylindrical extension 2 of which has integrally therewith a plurality of radial arms 3. These arms are at intervals and diametrically opposed. Formed integrally with the outer end of said arms is a circular band 4. The arms 3 are connected to the band 4 adjacent its upper edge, whereby the greater cylindrical wall of the band may telescope the outer exterior surface of the contracted mouth end 5 of the jar 6, said band acting to prevent excessive lateral movement of the funnel. The lower cylindrical extension 2 of the funnel extends into the mouth end, which also pretends excessive lateral movement of the funnel, that is to the extent that would cause the funnel to tilt over. The cylindrical extension 2 is spaced from the inner wall of the mouth end of the jar, to permit of the escape of the steam, from the mit of the jar, as the subsequent hot fruit is passing through and filling up against the side walls of the funnel. The arms 3 rest on the upper marginal edge of the mouth end of the jar to support the funnel as shown clearly in Fig. 2.

The invention having been set forth what is claimed as new and useful is:—

The combination with a funnel, of means carried thereby for supporting the funnel in a vertical position on a receptacle mouth, said supporting means comprising radially and horizontally disposed arms integrally joined to the funnel adjacent its lower end, an annular band connecting the radially and horizontally disposed arms at their ends, said band being spaced from the funnel wall and projecting downwardly from the outer ends of the radially disposed arms, said radially disposed arms engaging a receptacle mouth supporting the funnel thereon and allowing escape of steam from the receptacle, the lower end of the funnel preventing displacement of the funnel on the receptacle mouth.

In testimony whereof I have signed my name to this specification in the presence of two subscribing witnesses.

RUBY G. MELCHIOR.

Witnesses:
 A. BARNIG GOULD,
 FRANK SCHERRER.